UNITED STATES PATENT OFFICE.

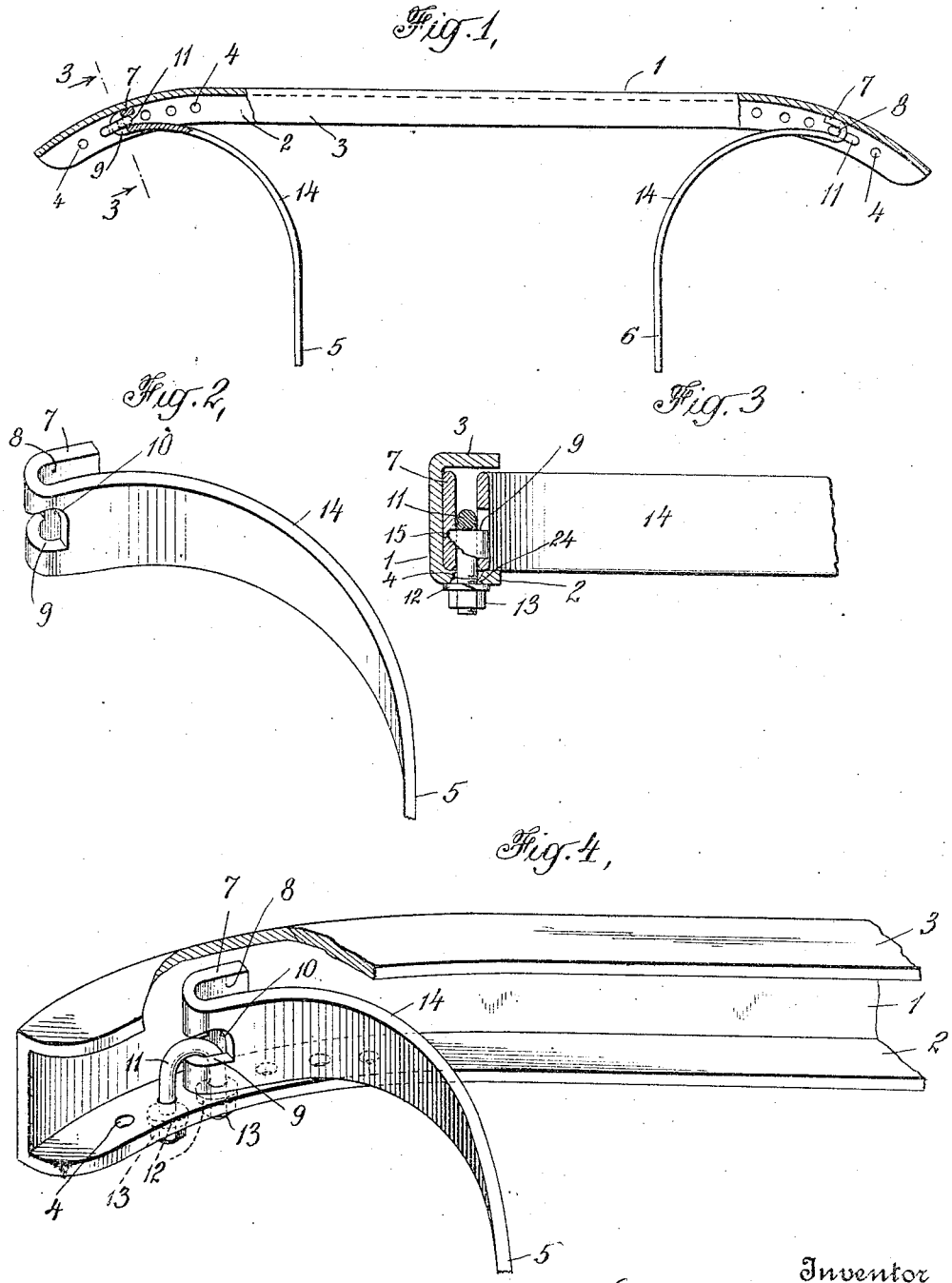

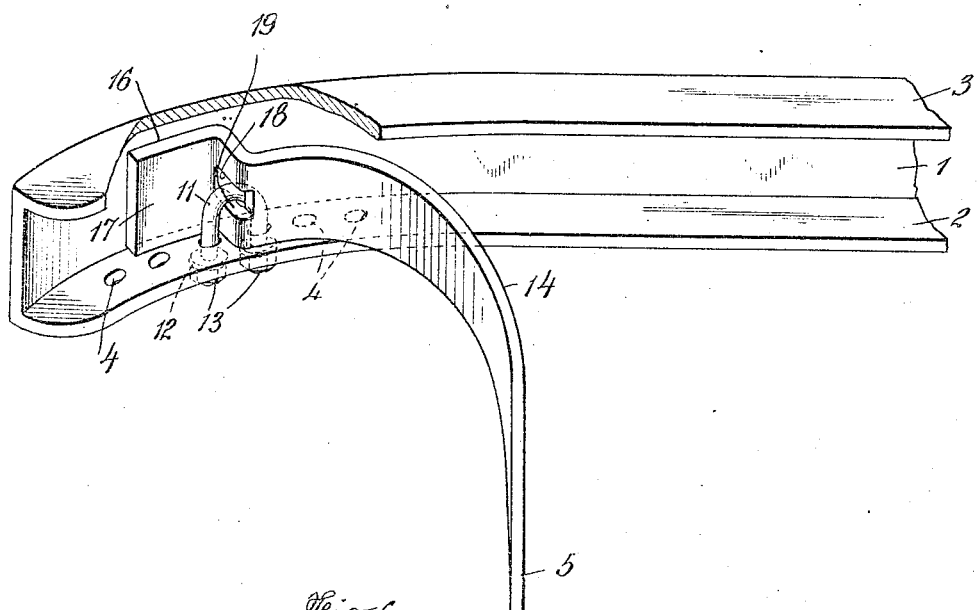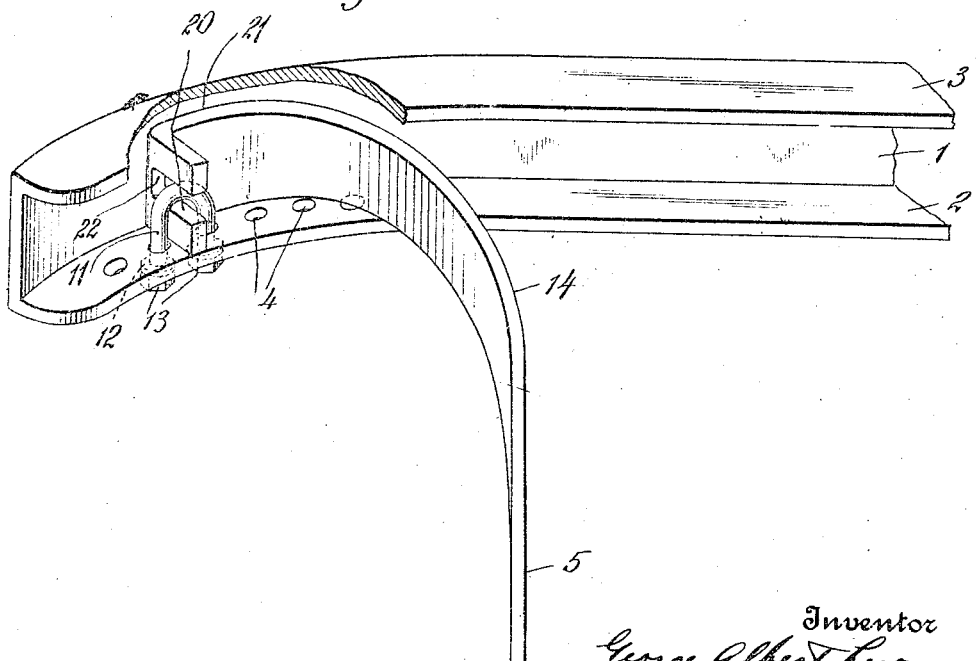

GEORGE ALBERT LYON, OF PHILADELPHIA, PENNSYLVANIA.

CHANNEL-BAR BUFFER.

1,325,739.

Specification of Letters Patent.   Patented Dec. 23, 1919.

Application filed April 3, 1919. Serial No. 287,202.

*To all whom it may concern:*

Be it known that I, GEORGE ALBERT LYON, a citizen of the United States, and resident of Philadelphia, county of Philadelphia, State of Pennsylvania, have made a certain new and useful Invention Relating to Channel-Bar Buffers, of which the following is a specification, taken in connection with the drawing, which forms part of the same.

This invention relates especially to automobile buffers having angular or channeled bumper bars and coöperating supporting members which may be conveniently formed of vertically rigid spring steel strip connected to the channeled bumper bar in the same general way as described and claimed in my co-pending application, Serial No. 215,762, filed February 7, 1918. These supporting members may comprise attaching members to be clamped or otherwise connected to the automobile frame and each supporting member may have an outwardly curved resilient portion and have a recurved or otherwise bent end to form a connector loop or portion which may be clamped edgewise to the bumper bar by U-bolt connectors. For this purpose connector slots may advantageously be formed in the lower flange of the bumper bar and may in some cases be inclined or angularly arranged so that the U-bolt forces or wedges the connector portion of the supporting member toward or against the web of the bumper bar to give a more rigid and strong attachment. The connector U-bolt may extend through the closed aperture or other slot adjacent the end of the supporting member and the two nuts engaging the U-bolt preferably beneath the flange of the bumper bar give double security to this connection and minimize to an important extent the danger of the connection rattling loose at either end of the buffer.

In the accompanying drawings showing in a somewhat diagrammatic way illustrative embodiments of this invention, Figure 1 is a top view partly in section showing one form of buffer.

Fig. 2 is a perspective view on an enlarged scale showing one of the supporting members thereof.

Fig. 3 is an enlarged transverse section taken substantially along the line 3—3 of Fig. 1.

Fig. 4 is an enlarged perspective view showing a supporting member and connected buffer end; and Figs. 5 and 6 are enlarged perspective views showing buffer ends and connected supporting members of different constructions.

The bumper bar of any desired angular or channeled section may as indicated in Fig. 1 have rearwardly curved ends and may comprise a web 1 and flanges 2, 3. A series of connector holes or apertures of any suitable shape and size may be formed in one of the flanges adjacent each end of the bumper bar and for most purposes these connector holes are preferably formed in the lower flange so that the connector devices are concealed and protected to a greater extent. For some purposes it is advantageous to have these connector holes 4 given a somewhat angular form as shown in greater detail in Fig. 3 so that the coöperating U-bolt 11 or other connector may be angularly inserted in the desired holes and when tightened its strong engagement with the rear edge 24 of any one of these holes tends to force the connector bolt and connector portions of the coöperating supporting members forward into tight alining engagement with the inside surface 15 of the web of the bumper bar. U-bolt connectors are decidedly advantageous in this connection since the U-bolts 11 may as indicated in Fig. 4 have a sufficient width between their parallel shank portions so that some little adjustment of the ends of the supporting members may be made without changing the connector bolt in its holes. Furthermore by having lock washers 12 and nuts 13 engage both threaded ends of the U-bolt a stronger connection is secured and one which is still fairly effective even if one of these nuts becomes loosened or disengaged.

The supporting members may advantageously be formed of resilient strip such as spring steel, which may be hardened and tempered and may have considerably greater vertical width than thickness so as to secure the desired vertical rigidity while rendering these supporting members many times more yielding in horizontal directions. These supporting members 14 may comprise the rearwardly extending attaching portions 5, 6 to be clamped or otherwise secured to the frame of the automobile or other vehicle. Each of the supporting members is preferably formed with an outwardly curved resilient portion and with a looped, curved or bent connector portion for coöperation with the bumper bar and the connector bolts or devices used. It is of advantage to have the curved end portion of these supporting members more or less gradually merge into the outline of the bumper bar flanges which, as indicated in Figs. 1, 4 and 5 contributes to the pleasing contour of the assembled buffer.

If desired the end of each of the supporting members may be formed with a recurved alining end 7 as indicated in Figs. 1 to 4 so that an open connector loop 8 is formed between this end and the adjacent portion of the supporting member so that the U-bolt or other connector may be accommodated therein. A connector aperture may be formed in this part or connector portion of the supporting member preferably before it is bent up into this recurved form and this aperture may in some cases be advantageously formed with an enlarged inserting portion 10 as shown in Figs. 2 and 4 to facilitate the insertion of the U-bolt connector therein which may be slipped around into the relatively narrow portion of this aperture adjacent the looped end of a supporting member so that substantially tight or even wedging engagement may be secured between the U-bolt connector and the connector section or portion 9 with which it coöperates. The U-bolt connector and end of the supporting-member may then be inserted in the channeled end of the bumper bar which is facilitated by the angular arrangement of the connector holes 4 therein and then the tightening of the connector nuts 13 draws down the adjacent edges of the supporting member against the lower flange 2 of the bumper bar and simultaneously forces its forward alining end 7 against the inside face 15 of the web of this bumper bar so that substantially rigid and secure connection of the parts is effected. The device may thus be assembled by practically any one and by using the proper connector holes 4 the effective width of the rearwardly extending attaching members or their distance apart may be adjusted to suit various automobile or other vehicle frames to which they are to be clamped or secured.

Fig. 5 shows another arrangement in which the curved end of the securing member 14 may be formed with a transversely extending connector portion 19 in which the closed end connector aperture 18 may be formed, an outturned alining end 17 being formed on this supporting member so that a substantially flat or alining face or end 16 is thus provided to be tightly clamped against the inside of the bumper bar web to promote the alinement of the parts. The supporting members may, however, as shown in Fig. 6, each be formed with a transverse end 20 in which the connector slot 22 may be formed to accommodate the U-bolt connector 11 and the adjacent portion of the supporting member may be a substantially flat or suitably curved alining portion 21 which may have an effective alining action in connection with the bumper bar web when forcibly clamped or forced against the same by the U-bolt 11 which may clamp the lower edge of the connector section 20 of this securing member down against the lower flange of the bumper bar.

These automobile buffers may be effectively packed and shipped in separated condition and may be assembled and the supporting members connected to the automobile frame before or after they are bolted to the bumper bar either by the ordinary garage man or by an automobile owner so that a strong and effective buffer is secured in which a desirable degree of resilience is provided through the use of such spring strip supporting members which are bolted in alined position with respect to the ends of the channeled or angle iron bumper bar.

This invention has been described in connection with a number of illustrative embodiments, forms, proportions, parts, arrangements, materials and methods of connection and use, to the details of which disclosure the invention is not of course to be limited, since what is claimed as new and what is desired to be secured by Letters Patent is set forth in the appended claims.

I claim—

1. The automobile buffer comprising a channeled section bumper bar having a series of connector holes formed in its lower flange, a pair of supporting members formed of resilient strip and each having a rearwardly extending attaching member, a curved resilient intermediate portion and an open loop connector portion formed with an alining end and with a connector aperture, a connector U-bolt adapted to pass through each of said connector apertures and through said connector holes, and connector nuts coöperating with the lower flange of said bumper bar to clamp thereto the lower edges of said supporting members and simultaneously force the recurved alining ends of said supporting members against the web of said bumper bar.

2. The automobile buffer comprising a channeled section bumper bar having a series of connector holes formed in its lower flange, a pair of supporting members formed of resilient strip and each having a rearwardly extending attaching member and a connector portion formed with an alining end, a connector U-bolt adapted to pass through said connector holes and coöperate with each of said connector portions, and connector nuts coöperating with the lower flange of said bumper bar to clamp thereto the lower edges of said supporting members and simultaneously force the alining ends of said supporting members against the web of said bumper bar.

3. The automobile buffer comprising a channeled bumper bar formed with series of connector holes in its lower flange adjacent the ends thereof, a pair of resilient supporting members each having a rearwardly extending attaching member and an outwardly curved intermediate portion and an open-ended connector loop formed with a closed end connector aperture and a U-bolt connector adapted to pass through each one of said connector apertures in said supporting members and through a pair of said connector holes to securely clamp an edge of said connector portion against the lower flange of said bumper bar and adjustably connect said supporting members to said bumper bar to enable them to fit automobile frame members which are at different distances apart.

4. The automobile buffer comprising a channeled bumper bar, a pair of resilient supporting members each having a rearwardly extending attaching member and a connector portion formed with a connector aperture and a U-bolt connector adapted to pass through each one of said connector apertures in said supporting members and coöperate with said bumper bar to securely clamp an edge of said connector portion against a flange of said bumper bar and connect said supporting members to said bumper bar.

5. The automobile buffer comprising a channeled bumper bar provided with a series of connector holes angularly formed in the lower flange of said bumper bar, a pair of resilient supporting members formed of vertically rigid spring steel strip and each having a rearwardly extending attaching member and a connector portion formed with an alining member and with a connector aperture, and a connector bolt adapted to pass through each of said connector apertures in said supporting members and through a pair of said connector holes to securely clamp an edge of said connector portion against the lower flange of said bumper bar and simultaneously force the alining member against the inner face of the bumper bar web to promote alinement therewith and adjustably connect said supporting members to said bumper bar to enable them to fit automobile frame members which are at different distances apart.

6. The automobile buffer comprising a channeled bumper bar provided with connector holes angularly formed in a flange of said bumper bar, a pair of supporting members each having a rearwardly extending attaching member and a connector portion formed with an alining member and with a connector aperture, and a connector bolt adapted to pass through each of said connector apertures in said supporting members and through said connector holes to securely clamp an edge of said connector portion against the flange of said bumper bar and simultaneously force the alining member against the inner face of the bumper bar web to promote alinement therewith and connect said supporting members to said bumper bar.

GEORGE ALBERT LYON.